US008019361B2

(12) United States Patent
Ignatius et al.

(10) Patent No.: US 8,019,361 B2
(45) Date of Patent: Sep. 13, 2011

(54) PROVISION OF LOCATION INFORMATION

(75) Inventors: Jan Ignatius, Espoo (FI); Petri Kokkonen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/003,167

(22) Filed: Dec. 20, 2007

(65) Prior Publication Data

US 2008/0102860 A1     May 1, 2008

Related U.S. Application Data

(63) Continuation of application No. 10/502,762, filed as application No. PCT/IB02/00847 on Jan. 29, 2002, now Pat. No. 7,321,778.

(51) Int. Cl.
*H04W 72/00* (2009.01)
(52) U.S. Cl. ...................................... 455/456.5; 342/457
(58) Field of Classification Search ................ 455/456.5; 342/457
See application file for complete search history.

(56) References Cited

U.S. PATENT DOCUMENTS

| 6,236,365 B1 * | 5/2001 | LeBlanc et al. ................ 342/457 |
| 6,394,341 B1 | 5/2002 | Makipaa et al. |
| 7,321,778 B2 * | 1/2008 | Ignatius et al. ............ 455/456.5 |

FOREIGN PATENT DOCUMENTS

| EP | 1 126 732 A2 | 8/2001 |
| EP | 1 158 826 A2 | 11/2001 |
| GB | 2 372 175 A | 8/2002 |
| WO | WO 00/79811 A1 | 12/2000 |
| WO | WO 01/28273 A1 | 4/2001 |
| WO | WO 01/60083 A2 | 8/2001 |
| WO | WO 02/49380 | 6/2002 |

OTHER PUBLICATIONS

European Office action for corresponding EP application No. 02 707 054.9-2412 dated Nov. 15, 2006, pp. 1-10.
European Office action for corresponding EP application No. 02 707 054.9-2412 dated Sep. 22, 2010, pp. 1-11.

* cited by examiner

*Primary Examiner* — William D Cumming
(74) *Attorney, Agent, or Firm* — Ditthavong Mori & Steiner, P.C.

(57) ABSTRACT

An approach is provided for managing subscriber identity and location information within a mobile telecommunication network. Transmission of location data to a third party over a communication network is initiated, the location data being indicative of a geographical location of an apparatus. Transmission of an access request to a networking node including a destination application is initiated, the access request including a unique identifier of the apparatus.

16 Claims, 2 Drawing Sheets

PROVISION OF LOCATION INFORMATION

CROSS REFERENCE TO RELATED APPLICATIONS

This is a Continuation of application Ser. No. 10/502,762, filed Oct. 12, 2004, which is a National Stage of PCT/IB02/00847, filed Jan. 29, 2002. The disclosure of the prior applications is hereby incorporated by reference herein in its entirety.

FIELD OF INVENTION

The present invention relates to the management of subscriber identity and location information within a mobile telecommunications network.

The invention has been developed for use within third generation (UMTS) networks and will be described primarily with reference to this application. However, it will be appreciated that the invention may have application under many other standards and protocols.

BACKGROUND OF INVENTION

Communication systems providing mobility for the users thereof are known. A well-known example of such mobile communication systems is the public land line mobile network (PLMN), of which cellular communications networks are an example. Another example is a mobile communication system that is based, at least partially, on use of communication satellites.

In such systems, the mobile network apparatus and/or user equipment such as a mobile station can be employed for provision of information regarding the geographical location of the user equipment and thus the user thereof. The position of mobile user equipment, and the equipment's user, can be positioned by various techniques. For example, fairly accurate geographical location information can be obtained based on the known satellite based GPS (Global Positioning System). More accurate location information can be obtained through differential GPS techniques.

Another possibility is to use a location service based on a cellular telecommunications system. In this approach, the cells or similar geographically limited radio access entities and associated controllers of the communication system are utilised in production of at least a rough estimate of the current location of the mobile user equipment. To improve the accuracy of the location information the communication system may be provided with specific location measurement units that provide more accurate data concerning the location of user equipment within the service area of the cellular system. It is also possible to ascertain a geographical location when the mobile user equipment is located within the coverage area of a visited or "foreign" network. The visited network may be made capable of transmitting the location of the mobile user equipment back to the home network, e.g. to support services that are based on location information or for the purposes of routing and charging. The production of data for the location determinations does not form an essential element of the present invention, and is thus not described in any greater detail herein.

The location data may be processed in a specific location service entity that is implemented either within the cellular system or connected thereto. The location data may also be processed in the user equipment that is provided with appropriate processing capacity. The location service entity provided by the communication system may serve different clients via an appropriate interface.

The location information may be used for various purposes, such as for location of a mobile telephone that has made an emergency call, for locating vehicles or given mobile subscribers and so on. In general, a client such as a User Equipment or another entity wishing to receive location information regarding a User Equipment may send a request for such information to the location service provision entity. The location service provisioning entity will then process the request, obtain the required data and generate an appropriate response.

An example of the provision of the location information by a PLMN is described in more detail $3^{rd}$ Generation Partnership Project (3GPP) technical specifications, see e.g. 3GPP TS 23.271 version 4.2.0, titled "Functional stage 2 description of LCS", June 2001.

According to the 3GPP specification a location service (LCS) server entity referred to as a Gateway Mobile Location Center (GMLC) is provided for managing the location services. The GMLC is for gathering and storing various data that may be used in provision of location information for location service clients (LCS clients). The LCS Client may make use of that location information for various services/applications. A possible application comprises a LCS client arranged to provide location information in response to a request for non-call related location information. Such a request for location information is referred to in the 3GPP specifications as a non-call related MT-LR (Mobile Terminated Location Request).

Use of a so-called "Authorized UE List" has been proposed. This list contains Mobile Subscriber ISDN (MSISDN) numbers or groups of MSISDNs that are authorised to initiate a location information provision procedure. That is, MSISDNs or groups of MSISDN are listed for which the LCS Client may issue a non-call related MT-LR. Separate lists of MSISDNs may be associated with each distinct external or non-call related client identity.

The LCS Client who is external to the PLMN system may only be enabled to validly issue location information requests for those MSISDNs that are found on the "Authorized UE List". That is, the LCS client's request may only be responded for subscribers who subscribe to the location services provided by the PLMN, as their MSISDNs would not otherwise appear on the list.

Request from the LCS Client are authenticated based on a combination of a Client ID and password stored in a LCS Client profile at the LSC server (e.g. the GMLC) and authorized based on the "Authorized UE List". That is, the LCS client is authorised to receive location information from the GMLC entity if the requesting user equipment (UE) is found from the list.

Whilst provision of location information from the operator's network (location middleware) to an LCS client or other third party can provide some advantages to the user, there is also the issue of privacy to be considered. For example, passing the MSISDN to the LCS client or other third party would enable both identification of the user and their location. Enabling access to such a combination of information represents a serious privacy invasion for many users. It is therefore desirable to provide a mechanism for controlling provision of such information.

SUMMARY OF THE INVENTION

In accordance with a first aspect of the invention, there is provided a method of passing location data within a communication network to a third party, the location data being indicative of a geographical position of a mobile telecommunications device, the method including the steps of:

determining the location data associated with the telecommunications device;

receiving from the mobile telecommunications device an access request including a destination application and a unique identifier of the mobile telecommunications device;

determining an alias identifier for the mobile telecommunications device;

replacing the unique identifier in the access request with an alias identifier for the telecommunications device;

forwarding the access request to the destination application; and forwarding the location data with the alias to the destination application, thereby enabling the destination application to associate the access request with the location data.

Preferably, the location data is originally determined with reference to the unique identifier, the method including the step of replacing the unique identifier with the alias identifier prior to forwarding the location data to the destination application.

Preferably, the alias is predetermined for the unique identifier. In an alternative embodiment, a new alias is generated for each access request In a preferred form, the method further includes the step of applying a hash function to the unique identifier to generate the alias identifier in the form of a fixed length hash value In a particularly preferred embodiment, the access request is sent to a proxy server in the network, the proxy server being configured to replace the identifying data with the alias.

According to a second aspect of the invention, there is provided a communication network apparatus configured to pass location data within a communication network to a third party, the location data being indicative of a geographical position of a mobile telecommunications device, the communication network apparatus being configured to:

determine the location data associated with the telecommunications device;

receive from the mobile telecommunications device an access request including a destination application and a unique identifier of the mobile telecommunications device;

determine an alias identifier for the mobile telecommunications device;

replace the unique identifier in the access request with an alias identifier for the telecommunications device;

forward the access request to the destination application; and forward the location data with the alias to the destination application, thereby enabling the destination application to associate the access request with the location data.

Preferably, the location data is originally determined with reference to the unique identifier, the communication network apparatus being configured to replace the unique identifier with the alias identifier prior to forwarding the location data to the destination application.

Preferably, the alias is predetermined for the unique identifier. In an alternative embodiment, a new alias is generated for each access request Preferably, the communication network apparatus is configured to apply a hash function to the unique identifier to generate the alias identifier in the form of a fixed length hash value In a particularly preferred form, the access request is sent to a proxy server in the network, the proxy server being configured to replace the identifying data with the alias.

BRIEF DESCRIPTION OF DRAWING

A preferred embodiment of the invention will now be described, by way of example only, with reference to the accompanying diagram of FIG. 1, which is a schematic overview of an embodiment of the invention, and with reference to the accompanying flowchart of FIG. 2, which is a process for passing location information within a communication network to a third party.

DETAILED DESCRIPTION OF PREFERRED EMBODIMENT OF THE INVENTION

Figure 1:
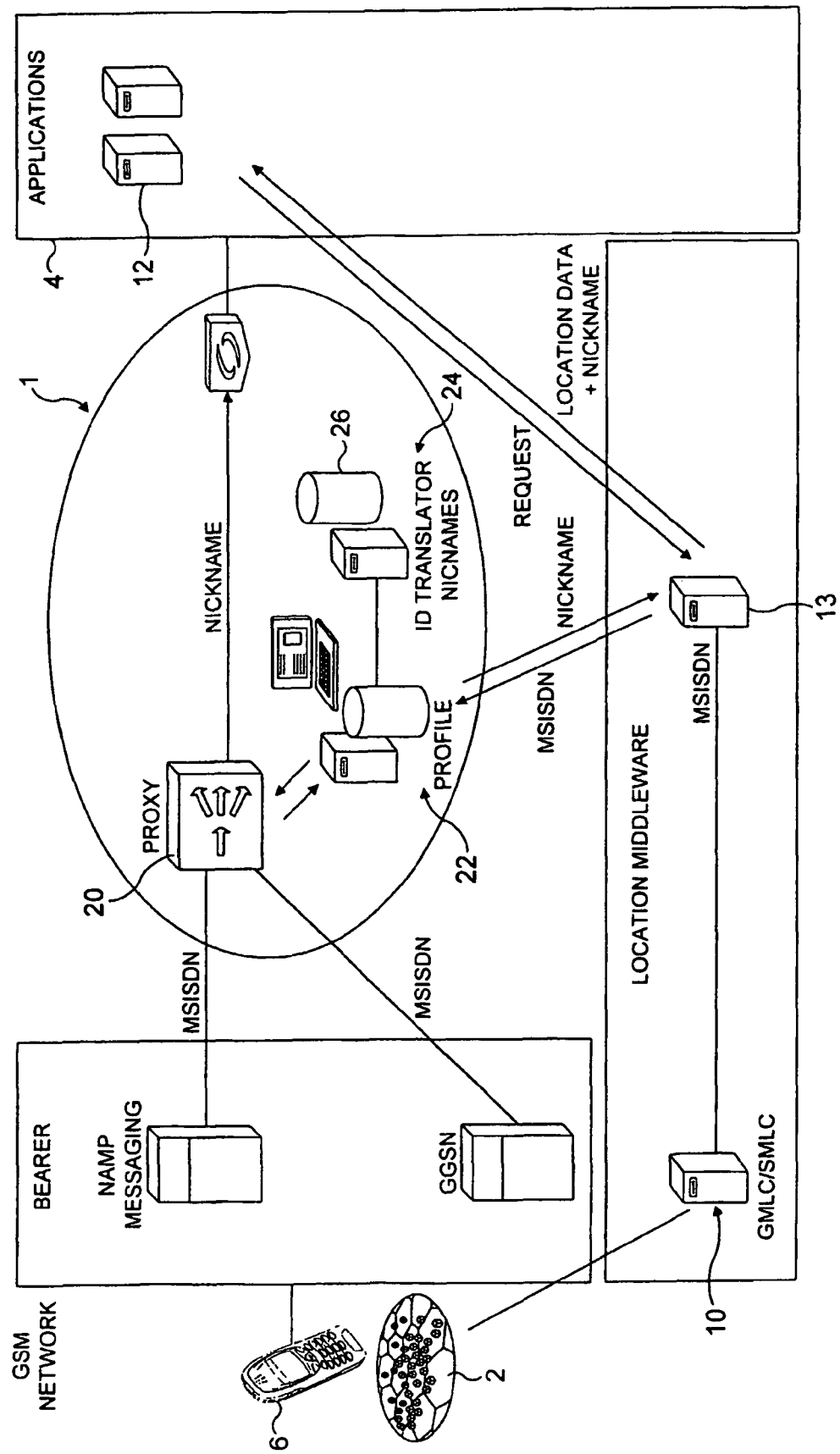

It should be appreciated that even though the exemplifying telecommunications network shown and described in more detail uses the terminology of the third generation (3G) UMTS (Universal Mobile Telecommunications System) public land mobile network (PLMN), the proposed solution can be used in any system providing mobile communications for users and some kind of location information service. Examples of other telecommunications systems include, without limiting to these, standards such as the GSM (Global System for Mobile communications) or various GSM based systems (such as GPRS: General Packet Radio Service), AMPS (American Mobile Phone System) or DAMPS (Digital AMPS), IMT 2000 (International Mobile Telecommunications system 2000), i-phone and so on.

Turning to the drawing, there is shown an arrangement in which base stations (not shown) of a cellular system 1 provide radio coverage areas within cells 2. Each radio coverage area 2 is typically served by a base station. It should be appreciated that one cell may include more than one base station site. A base station apparatus or site may also provide more than one cell. The shape and size of the cells 2 depend on the implementation and may be different from the illustrated shapes. The shape and size of the cells may also vary from cell to cell. It should be appreciated that in some systems the base station may be referred to as Node B.

User equipment in the form of mobile station (MS) 6 is also shown. It shall be appreciated that typically a number of MSs will be in simultaneous communication with each base station, although for the sake of clarity only a single MS 6 is shown in this case. Each base station is arranged to transmit signals to and receive signals from the MS 6 via a wireless interface, as is well understood by those skilled in the art. Likewise, the MS 6 is able to transmit signals to and receive signals from the base station.

Each of the base stations is connected to an access network controller such as a radio network controller (RNC) of a UMTS terrestrial radio access network (UTRAN). The radio network controller may be connected to appropriate core network entities of the cellular system, such as a MSC (mobile switching center) and/or SGSN (serving general packet radio service support node), via a suitable interface arrangement. These, however, do not form an essential element of the invention and are thus not explained in any greater detail.

The location of a mobile user equipment may vary in time as the user equipment is free to move within the coverage area of a base station and also from coverage to coverage area. Modern communication systems are capable of providing information regarding the geographical location of an MS within the coverage area thereof. The geographical location may be defined on the basis of the position of the mobile station relative to the base station(s) of the mobile telecommunications network. The geographical location of the user equipment may be defined, for example, in X and Y co-ordinates or in latitudes and longitudes. It is also possible to define the location of the base stations and/or mobile stations in vertical directions.

In FIG. 1 the location service (LCS) functionality of the communication system is provided by a Gateway Mobile Location Center (GMLC) entity 10. The GMLC location service node 10 is for gathering and storing data that is required for the provision of the location information. The location service node 10 is arranged to receive via appropriate interface means information concerning the location of the mobile user equipment from the cellular system.

The cellular system may be provided with various different means for processing information gathered from the cells and/or some other parameters and/or for computing by processor means appropriate calculations for determining and outputting the geographical location of the target user equipment. The location information may be obtained by using one or more of the appropriate location techniques. At least a part of the location information may be provided based on information provided by system that is separate from the communication system, such as by means of the Global Positioning System (GPS) or similar. Since there are various possibilities how to implement the location services in the cellular system and since the invention is not dependent on the used location determination technology, these are not be described in any greater detail herein.

The location service node may be implemented in the core network by means of a LCS server entity 10. The LCS server 10 is arranged to receive location information from the radio access network via appropriate controller entities such as the MSC and/or SGSN connected by the appropriate interface means to the access network.

This location service node may provide the location information in a predefined manner to a destination application 12. Such destination applications can be any entity that makes use of the location information, and can be considered a logical functional entity that may make a request to the location service entity 10 for the location information of one or more target user equipment.

As shown by FIG. 1, the destination application 12 can be external to the communication network 1, the client entity 12 being provided in an ASP domain 4. The destination application can alternatively be an internal client (ILCS) residing in any entity or node (including a mobile station) within the communication system 1.

The destination application is entitled to receive at least some degree of information concerning the location (or location history) of the MS 6. The particular requirements and characteristics of a destination application are typically known to the location service server of the communication system by its LCS client subscription profile.

The location service server (LCS) 10 provides a platform supporting location based services in parallel with other telecommunication services such as speech, data, messaging, other teleservices, user applications and supplementary services. The LCS 10 may thus be configured to provide the destination application 12, on request or periodically, the current or most recent geographic location (if available) of the target user equipment or, if the location fails, an error indication and optionally the reason for the failure. A more detailed description of a LCS entity that may be employed in the embodiments of can be found e.g. from the above referenced 3GPP technical specification No. 3GPP TS23.271.

It will be appreciated that the LCS server will usually be supported by other middleware such as a server 13.

A network entity in the form of a proxy server 20 is provided for providing an alias identifier to replace the unique identity of the subscriber. The proxy server 20 can interface with profile data 22 and an ID translator 24. The profile data includes subscriber information including the subscriber's MSISDN.

There is also provided an ID pool/generator 26 that supplies or generates alias identifiers when required. In some cases it is desirable to provide a one-off temporary alias that is used only once for an access request sent from the mobile station. In this case, the alias can be drawn from a pool of available aliases stored within the ID translator. Alternatively, an alias can be generated in a random or pseudo random way, as long as there is no risk of duplication for any other active sessions with the destination application of interest.

In other cases, the alias identifier for a given MSISDN is fixed in relation to each potential destination application. Such permanent alias identifiers can be generated prior to being needed, or can be generated the first time they are required. The particular alias allocated to a given mobile device can be generated or sourced in any of a number of ways that will suggest themselves to those skilled in the art. However, the preferred method is to apply a hash function to the MSISDN of the mobile device to generate a unique fixed length hash that can be associated with that MSISDN in the long term.

Figure 2:
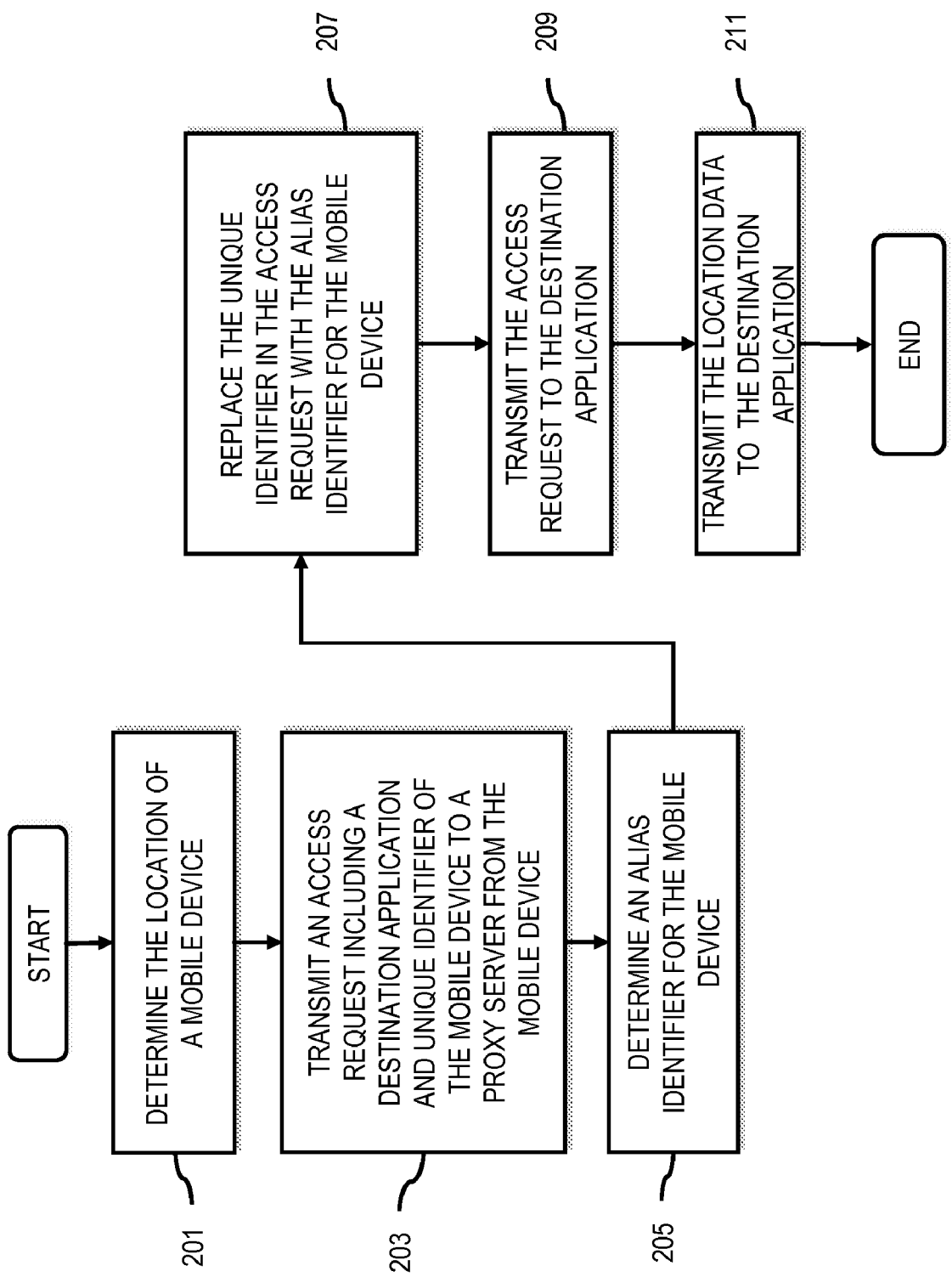

As depicted in FIG. 2, in step 201, the location of a mobile device is determined by one of the above discussed techniques. In use, attempting to access the application destination results in the proxy server receiving an access request from the mobile device, in step 203. The access request can be in any suitable form, such as an HTTP GET or POST-request for a specific URL (which is registered as an LCS Client Application with the proxy server 20). The subscriber's identify (MSISDN) can be included as a parameter of a POST request. Alternatively, it can be included within the HTTP header in form such as: &subsident=+358401234567. The request also includes the access data.

In step 205, the proxy server obtains an appropriate alias identifier for the circumstances from the subscriber's profile, or, if necessary, from the ID translator/generator. The proxy server then replaces the ISDN in the access request with the appropriate alias identifier, in step 207. In step 209, the access request is provided to the destination application.

The location middleware also communicates with profile and/or ID translator/generator to ascertain the alias of the MSISDN. The alias identifier is then added to the location data that has been determined for the mobile device and provided to the destination application, in step 211.

In the above the identifier was described as being on the Mobile Subscriber ISDN (MSISDN) number of the user. Other possibilities for the unique identifier include the IMSI, TIMSI, password, and so on. In principle the identifier may be any anything as long as it can be processed by the PLMN system so that the verification can be made based on it.

Responses by the LCS client 12 to location information requests may have the form of simple coordinate (x, y) information or contain more value added services like a reverse-geocoded response provided with a street name or a map reference. The response may even comprise a map and a pointer on the map.

It should be appreciated that the elements of the location service functionality may be implemented anywhere in the telecommunications system. The location service implementation may also be distributed between several elements of the system. Furthermore, although the above describes embodiments employing a specific LCS client node, this is not a necessity. The request for location information may be addressed directly to a location service entity of the communication system, such as to the GMLC or any other element associated with the provision of location information. If a LCS client is used, it does not need to be an external element, but may also be implemented within the communication network and/or be run the by the operator of the network.

It should be appreciated that whilst embodiments of the present invention have been described in relation to user equipment such as mobile stations, embodiments of the present invention are applicable to any other suitable type of user equipment.

Although the invention has been described with reference to a specific example, it will be appreciated that the invention can be embodied in many other forms.

The invention claimed is:

1. An apparatus comprising:
    a processor; and
    at least one memory including computer program code,
    the at least one memory and the computer program code configured to, with the processor, cause the apparatus to perform at least the following,
    initiate transmission of location data over a communications network to a party external to the network, the location data being indicative of a geographical location of the apparatus, and
    initiate transmission of an access request to a networking node including a destination application, the access request including a unique identifier, wherein the unique identifier is replaced with an alias prior to being received at the networking node.

2. The apparatus according to claim 1, wherein the unique identifier is a mobile subscriber integrated services digital network number (MSISDN).

3. The apparatus according to claim 1, wherein the access request is received at a proxy server prior to being received at the networking node, the proxy server being configured to replace the unique identifier with the alias and to forward the access request including the alias to the networking node.

4. The apparatus according to claim 1, wherein the processor is further configured to initiate access to a middleware application identified by a uniform resource locator, the middleware application being configured to provide the alias, wherein the unique identifier is the alias.

5. The apparatus according to claim 1, wherein the communications network is a general packet radio service (GPRS) or a time division multiple access (TDMA) network and the processor is further configured to initiate transmission of the access request over the communications network via a gateway GPRS support node (GGSN).

6. The apparatus according to claim 1, wherein the communications network is a third generation (3G) network and the processor is further configured to initiate transmission of the access request over a packet switched data network (PSDN).

7. The apparatus according to claim 1, wherein the destination application is a location service (LCS) client.

8. The apparatus according to claim 1, wherein the unique identifier is of the apparatus.

9. An apparatus comprising:
    processing means configured to initiate transmission of location data over a communications network to a party external to the network, the location data being indicative of a geographic location of the apparatus,
    wherein the processing means is further configured to initiate transmission of an access request to a networking node including a destination application, the access request including a unique identifier, wherein the unique identifier is replaced with an alias prior to being received at the networking node.

10. The apparatus according to claim 9, wherein the unique identifier is of the apparatus.

11. A method comprising:
    initiating transmission of location data over a communications network to a party external to the network, the location data being indicative of a geographical location of an apparatus; and
    initiating transmission of an access request to a networking node including a destination application, the access request including a unique identifier, wherein the unique identifier is replaced with an alias prior to being received at the networking node.

12. The method according to claim 11, wherein the unique identifier is a mobile subscriber integrated services digital network number (MSISDN).

13. The method according to claim 11, wherein the access request is received at a proxy server prior to being received at the networking node, the proxy server being configured to replace the unique identifier with the alias and to forward the access request including the alias to the networking node.

14. The method according to claim 11, further comprising:
    initiating access to a middleware application identified by a uniform resource locator, the middleware application being configured to provide the alias, wherein the unique identifier is the alias.

15. The method according to claim 11, wherein the destination application is a location service (LCS) client.

16. The method according to claim 11, wherein the unique identifier is of the apparatus.

* * * * *